(12) United States Patent
Dabrowski

(10) Patent No.: US 10,037,027 B2
(45) Date of Patent: Jul. 31, 2018

(54) SYSTEM AND METHOD FOR DETERMINING AN ENERGY-EFFICIENT PATH OF AN AUTONOMOUS DEVICE

(71) Applicant: ADVANCED DIGITAL BROADCAST S.A., Eysins (CH)

(72) Inventor: Bartosz Dabrowski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 0 days.

(21) Appl. No.: 15/635,222

(22) Filed: Jun. 28, 2017

(65) Prior Publication Data

US 2018/0004198 A1 Jan. 4, 2018

(30) Foreign Application Priority Data

Jun. 30, 2016 (EP) .................................... 16177149

(51) Int. Cl.
 *G05D 1/00* (2006.01)
 *G05D 1/02* (2006.01)
(52) U.S. Cl.
 CPC ......... *G05D 1/0005* (2013.01); *G05D 1/0217* (2013.01); *G05D 1/0219* (2013.01); *G05D 1/024* (2013.01); *G05D 2201/0208* (2013.01); *G05D 2201/0215* (2013.01)
(58) Field of Classification Search
 None
 See application file for complete search history.

(56) References Cited

U.S. PATENT DOCUMENTS

| | | | |
|---|---|---|---|
| 6,259,988 B1 * | 7/2001 | Galkowski | G01C 21/00 340/989 |
| 9,904,285 B2 * | 2/2018 | Kuhara | G05D 1/0027 |
| 2006/0149465 A1 | 7/2006 | Park | |
| 2011/0184642 A1 | 7/2011 | Rotz | |
| 2016/0320774 A1 * | 11/2016 | Kuhara | G05D 1/0027 |
| 2017/0116487 A1 * | 4/2017 | Yamazaki | G06K 9/00805 |

FOREIGN PATENT DOCUMENTS

EP 1406140 4/2004

* cited by examiner

*Primary Examiner* — Jonathan M Dager
*Assistant Examiner* — Garrett F Evans
(74) *Attorney, Agent, or Firm* — Mark M. Friedman

(57) ABSTRACT

A method for determining an energy-efficient path of an autonomous device wherein said autonomous device moves over a global grid of cells into which a given operating area has been split, the method being characterized in that determination of said energy-efficient path comprises the steps of: processing of the current cell (201); taking a measurement σ of the processing (202); classifying the measurement σ to be of a particular level Σ (203), taking into account a predefined division, of the measurements results range, into a plurality of measurements levels; storing said classified measurement in a memory of the autonomous device (204) and associating it with the current cell; selecting a reference probability grid (205); updating (207) the probabilities by applying the reference grid (100) to the global grid at its current position such that every cell on the reference grid (100) corresponds unambiguously to one cell on the global grid; and moving the autonomous device to a next cell of the global grid (208) and setting said next cell as the current cell (201) in order to process the next cell.

9 Claims, 9 Drawing Sheets

| 100 | 0 | 0 | 0,2 | 0,2 | 0,2 | 0 | 0 |
|---|---|---|---|---|---|---|---|
| 106 | 0 | 0,2 | 0,5 | 0,5 | 0,5 | 0,2 | 0 |
| 102 | 0,2 | 0,5 | 0,7 | 0,7 | 0,7 | 0,5 | 0,2 |
| 107 | 0,2 | 0,5 | 0,7 | 1 | 0,7 | 0,5 | 0,2 |
| 103 | | | | | | | |
| 104 | 0,2 | 0,5 | 0,7 | 0,7 | 0,7 | 0,5 | 0,2 |
| | 0 | 0,2 | 0,5 | 0,5 | 0,5 | 0,2 | 0 |
| | 0 | 0 | 0,2 | 0,2 | 0,2 | 0 | 0 |

Fig. 1

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0,2 | 0,2 | 0,2 | 0 | 0 | 0 | 0 |
| 0 | 0 | 0 | 0,2 | 0,5 | 0,5 | 0,5 | 0,2 | 0 | 0 | 0 |
| 0 | 0 | 0,2 | 0,5 | 0,7 | 0,7 | 0,7 | 0,5 | 0,2 | 0 | 0 |
| 0 | 0 | 0,2 | 0,5 | 0,7 | 1 | 0,7 | 0,5 | 0,2 | 0 | 0 |
| 0 | 0 | 0,2 | 0,5 | 0,7 | 0,7 | 0,7 | 0,5 | 0,2 | 0 | 0 |
| 0 | 0 | 0 | 0,2 | 0,5 | 0,5 | 0,5 | 0,2 | 0 | 0 | 0 |
| 0 | 0 | 0 | 0 | 0,2 | 0,2 | 0,2 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

Fig. 2A

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0,2 | 0,2 | 0,2 | 0 | 0 | 0 | 0 |
| 0 | 0 | 0 | 0,2 | 0,36 | 0,36 | 0,36 | 0,2 | 0 | 0 | 0 |
| 0 | 0 | 0,2 | 0,6 | 0,85 | 0,85 | 0,85 | 0,6 | 0,2 | 0 | 0 |
| 0 | 0 | 0,36 | 0,75 | 0,91 | 1 | 0,91 | 0,75 | 0,36 | 0 | 0 |
| 0 | 0 | 0,36 | 0,75 | 0,91 | 1 | 0,91 | 0,75 | 0,36 | 0 | 0 |
| 0 | 0 | 0,2 | 0,6 | 0,85 | 0,85 | 0,85 | 0,6 | 0,2 | 0 | 0 |
| 0 | 0 | 0 | 0,2 | 0,6 | 0,6 | 0,6 | 0,2 | 0 | 0 | 0 |
| 0 | 0 | 0 | 0 | 0,2 | 0,2 | 0,2 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

Fig. 2B

SYSTEM AND METHOD FOR DETERMINING AN ENERGY-EFFICIENT PATH OF AN AUTONOMOUS DEVICE

TECHNICAL FIELD

The present invention relates to a system and method for determining an energy-efficient path of an autonomous device. In particular the present invention relates to surface processing devices: autonomous vacuum cleaners, autonomous mops, autonomous lawn mowers and the like.

BACKGROUND OF THE INVENTION

There are a number of surface processing devices available currently. All such devices depend on battery power and their ability to cover large surfaces is dependent on the ability to manage the usage of the aforementioned battery.

The method to process the whole surface varies from device to device and aims at covering as much of the surface as possible. It is also the characteristics of the autonomous devices to conserve power as much as possible.

The existing solutions focus on surface coverage and do not take battery usage into consideration when selecting route or do not gather information in order to help predict further battery usage. The device either runs until the battery is low or returns to its respective base station and resumes cleaning after a recharge of said battery.

Therefore, there exists an unaddressed need to develop a method to estimate power consumption of such an autonomous device in different operating conditions so that optimization to its operating may be implemented. This in turn allows for a more efficient selection of the path of the device and less power consumption and therefore less battery usage.

The aim of the development of the present invention is an improved and energy efficient method and apparatus for determining an energy-efficient path of an autonomous device.

SUMMARY AND OBJECTS OF THE PRESENT INVENTION

An object of the present invention is a method for determining an energy-efficient path of an autonomous device wherein said autonomous device moves over a global grid of cells into which a given operating area has been spot, the method being characterized in that determination of said energy-efficient path comprises the steps of: processing of the current cell; taking a measurement σ of the processing; classifying the measurement σ to be of a particular level Σ, taking into account a predefined division, of the measurements results range, into a plurality of measurements levels; storing said classified measurement in a memory of the autonomous device and associating it with the current cell; selecting a reference probability grid wherein values in the cells of the reference grid express a probability that the measurement of the processing will be the same in its respective cell as it is in the current cell, which represents the current position of the autonomous device, whereas a centre cell, associated with the current cell, is assigned a maximum probability while other cells within the reference grid have a probability assigned, which lowers with an increase of a distance of a cell from the current cell; updating the probabilities by applying the reference grid to the global grid at its current position such that every cell on the reference grid corresponds unambiguously to one cell on the global grid; and moving the autonomous device to a next cell of the global grid and setting said next cell as the current cell in order to process the next cell.

Preferably, taking a measurement σ of the processing comprises a battery level decrease in the cell.

Preferably, cells of the global grid have a hexagonal shape or an irregular rectangular shape.

Preferably, initially a probability in all cells of the global grid is set to 0.

Preferably, the step of updating the probabilities comprises for each measurement level Σ∈{1, 2, . . . , L} and for each processing m∈{1, 2, . . . , M} the probability p[Σ, m] is assigned a new value that is:
greater or equal to p[Σ, m] if σ∈ Σ
smaller or equal to p[Σ, m] if σ∉ Σ

Preferably, the applying the reference grid to the global grid at its current position takes into account the centre cell of the reference grid.

Preferably, the method further comprises the steps of: selecting a global grid's cell that is reachable; computing a predicted measurement, for the selected reachable cell, the predicted measurement being dependent on the measurement values, of the same kind, stored in the global grid; determining whether there are more reachable cells available and if there are, executing the selecting step in order to select the next reachable cell and otherwise selecting a next cell for processing.

Preferably, the predicted measurement is computed as a weighted sum p'[Σ, m] being a normalized value of p[Σ, m]:

$$p'[\Sigma, m] = \frac{p[\Sigma, m]}{\sum_{i=1}^{L} p[i, m]}$$

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for determining an energy-efficient path of an autonomous device. Further details and features of the present invention, its nature and various advantages will become more apparent from the following detailed description of the preferred embodiments shown in a drawing, in which:

FIG. 1 presents a reference grid promoting similar measurement around a device;

FIG. 2A presents an updated global grid after processing of a first cell;

FIG. 2B presents an updated global grid after processing of a second cell;

NOTATION AND NOMENCLATURE

Figure 3:
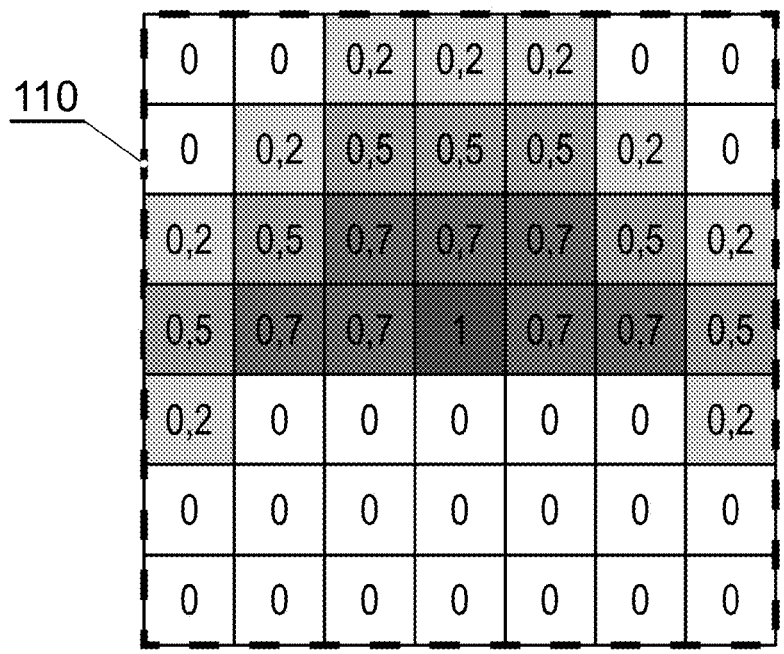
FIG. 3 presents a reference grid promoting similar measurement in front of the device.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computers registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The subject of the present invention is to optimize power consumption of such devices by estimations made on the base of the already processed parts of the surface. A person skilled in the art will appreciate that the scope of the present invention is in fact broader and is not limited to a vacuum cleaner or power consumption and that other types of device and other measurable parameters can also be applied.

For better understanding and clarity the autonomous vacuum cleaner is used as an exemplary device in the description of the present invention and the power consumption is used as an exemplary measured and optimized parameter.

An exemplary observable fact is that the flooring that the device is moving on can be less optimal towards movement in a particular direction than others. Such exemplary situation is a long ceramic floor tile (20 cm by 100 cm or the like). When all tiles are laid in parallel, the movement of a device with small wheels (up to the diameter of two times the space between tiles or the like) will be less bumpy in the direction of the longer side of the tiles and bumpier in the direction of the shorter side of the tiles. Hence, presumably the device should use the former direction primarily.

Another exemplary observable fact is vacuum cleaning of a downy carpet where the fibre is laid in a particular direction. Such surface takes substantially more power to traverse in the direction against the fibre than the opposite direction. Hence the route the vacuum cleaner selects may be more power consuming if too much of it is selected to be traversed in the direction opposite to the direction of the fibre.

An exemplary embodiment of the present invention is a surface treatment apparatus like a vacuum cleaner or lawn mower. The device moves over the surface such as floor, carpet, lawn, pavement and the like.

An inherent characteristic of this movement is its direction or speed or the like. In other embodiments of the present invention the inherent characteristic of the movement may be elevation over the surface or operating speed of the processing apparatus (such as a knife or a rotor) or the like.

It is not limiting to the present invention if there are more or fewer characteristics. The present embodiment requires only that there is defined a finite number of combinations of the characteristics of the processing of the surface, each of the combinations constituting one processing measure of the surface.

The simplest example may comprise just one characteristic of the processing being the direction of movement. In such a case, there may be two possible combinations: parallel to the axis of the modelled environment and perpendicular to the axis of the modelled environment.

Another example may comprise four combinations: east-west, west-east, north-south and south-north. It is apparent to a skilled person that the first example does not distinguish the direction of movement, merely its axis while the second example distinguishes both axis and direction on that axis.

Furthermore, it is not limiting to the present invention how all axes and environment directions are defined. Another example comprises two characteristics: axis and suction, both having two possible states. In this case the four combinations i.e. processing measures may be defined: parallel axis plus low suction, parallel axis plus high suction, perpendicular axis plus high suction and perpendicular axis plus low section. Another example may comprise just a subset of the aforementioned processing measures.

An embodiment of the present invention further defines a measure of processing. The measure of processing is any measurable parameter that can be determined per a particular fragment of the processed surface. An exemplary measure is battery level decrease in a given cell. Another exemplary measure is accuracy of cleaning on the cleaned fragment.

An embodiment of the present invention may define that an overall range of the measure is divided into levels (for classification purposes), which is a means of comparison of two values of the measure. If two values of the measure fall into the same level, they are considered same, otherwise they are considered different. Such a division and condition are exemplary only and should not be construed as limiting to the present invention. Other comparison methods may be used.

Figure 5:
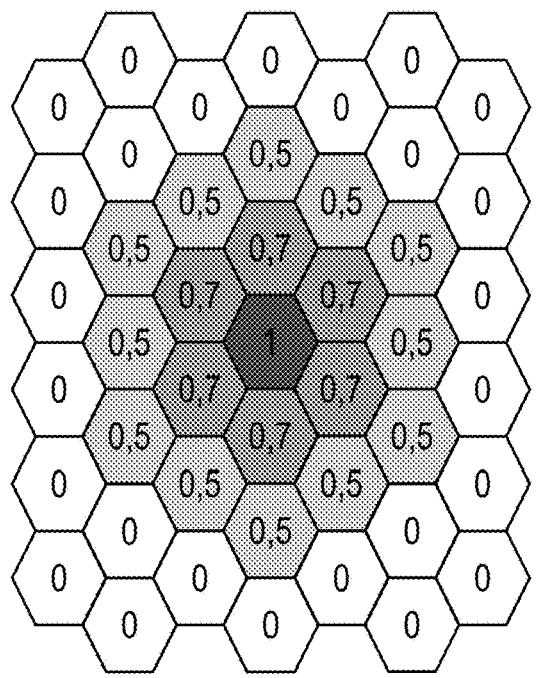
FIG. 5 presents an exemplary reference hexagonal grid.
Figure 6:
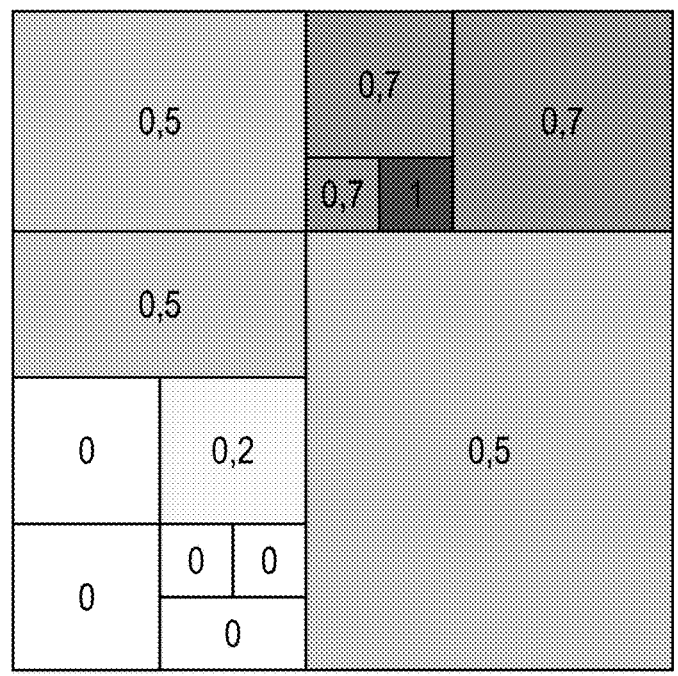
FIG. 6 presents an exemplary reference irregular rectangular grid.

The device according to the present invention divides its known environment into fragments (sections or subareas), preferably a grid. There are many kinds of grids that may be used. For example, FIG. 5 presents a hexagonal grid and FIG. 6 presents an irregular rectangular grid.

The preferred embodiment of the present invention assumes a rectangular grid throughout its description for clarity and comprehensibility. Examples of such grids may be seen in FIGS. 1, 2A, 2B, 3, 4 in different use cases. The grid that represents the environment as perceived by the device is called a 'global grid' hereinafter.

FIGS. 2A and 2B present global grid (120), wherein each cell of said grid is associated with a value representing energy consumption per cell or a factor representing such energy consumption per cell (123-127).

A device, according to the present invention, preferably assigns a probability factor to each cell of the grid having a particular relative position with respect to the device. FIG. 1 presents exemplary values of the probability (102-107). Its value expresses a probability that the measurement of the processing will be the same in its respective cell as it is in the current cell (103), which represents the current position of the device.

Preferably, a centre cell (associated with the currently processed cell (see the definition of the centre cell below)) (103) is assigned the probability of 1 (a maximum probability). It is further preferred that other cells within the grid (100) have a probability assigned. Additionally, the probability is the lower the larger the distance of a cell from the current cell (103) is.

Therefore, cells close to the current cell (103), e.g. (102) have high probability assigned e.g. 0,7 while those further away e.g. (104) have a lower value assigned. Moreover, all cells outside of the grid (100) have a value of 0 assigned (a minimum probability). This grid (100) being relevant to the position of the device and representing reference probability values in area is called a 'reference grid' hereinafter. The reference grid may be considered a mask on the global grid and will typically have a much smaller size than the global grid. Further, it is preferred that the reference grid has a centre cell i.e. for example in case of a 7×7 reference grid, the cell x4/y4 is the centre cell. Nevertheless, other shapes and sizes of the reference grid are acceptable as long as there is selected a reference grid placing cell that will be considered the centre cell.

It has been assumed that each cell in the global grid has one probability per processing measure and measurement level. Hence, the generic representation of the data, stored per a single cell in the global grid, is depicted by the following table:

|  | Measurement level 1 | Measurement level 2 | ... | Measurement level L |
|---|---|---|---|---|
| Processing measure 1 | Probability p[1, 1] | Probability p[2, 1] | ... | Probability p[L, 1] |
| Processing measure 2 | Probability p[1, 2] | Probability p[2, 2] | ... | Probability p[L, 2] |
| ... | ... | ... | ... | ... |
| Processing measure M | Probability p[1, M] | Probability p[2, M] | ... | Probability p[L, M] |

Preferably, any value used in this description of the present invention that is referred to as 'probability' or 'probability value' or 'value of probability' or the like, hereinafter is less than or equal to 1 and greater than or equal to 0. Naturally other systems of representing 'probability' than 0 to 1 may be applied.

Figure 7:
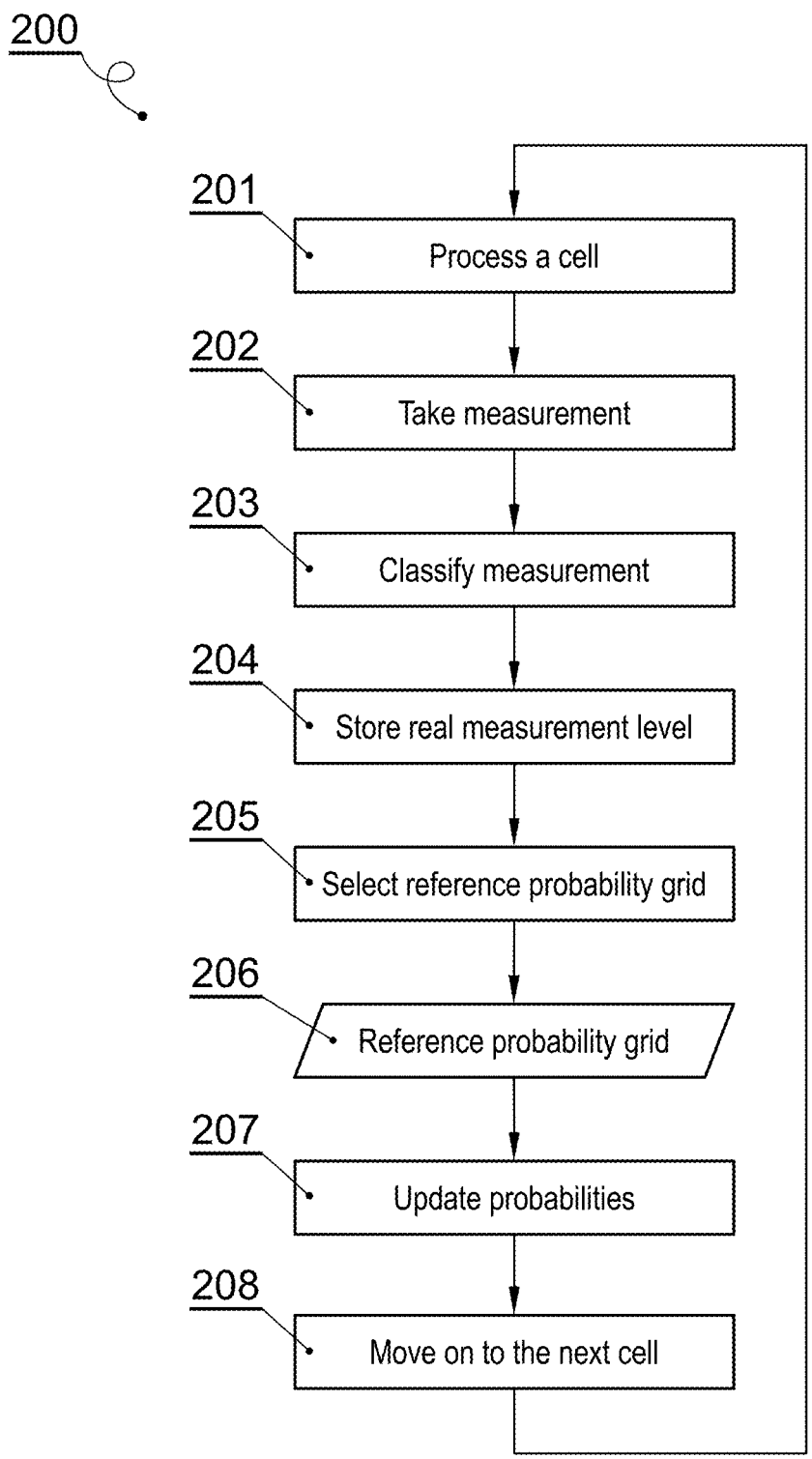
FIG. 7 presents an algorithm of updating of the global grid.

The device according to the present embodiment of the present invention operates according to the method (200) of FIG. 7. The method starts at step (201) with processing of the current cell. Next, a measurement σ of the processing is taken at step (202) (for example the aforementioned battery level decrease in a given cell). The measurement σ is classified (taking into account the division of the measurements results range into a plurality of measurements levels as indicated above) to be of a particular level Σ at step (203) and stored in the memory of the device (in the global grid) at step (204) (and thus associating it with the current cell). Next a reference probability grid (206) is selected at step (205) as defined in the following paragraph.

Figure 4:
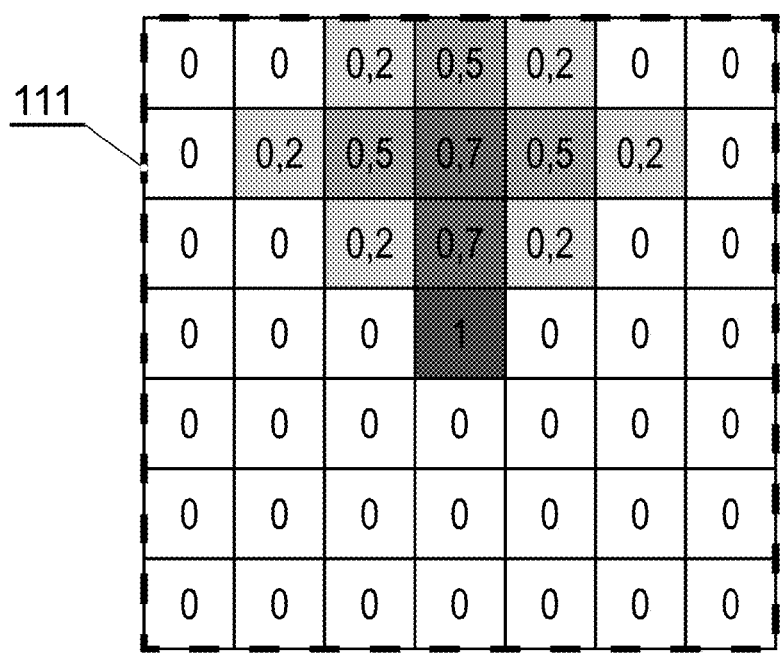
FIG. 4 presents a reference grid promoting similar measurement directly in front of the device.

An exemplary reference probability grid is depicted in FIG. 1. Other examples of reference probability grids are depicted in FIG. 3 and FIG. 4. A skilled person will appreciate that the grid (100) according to FIG. 1 will promote the area around the device to be of the same measure of processing while the grid (110) according to FIG. 3 will promote area that is at the same time around the current location of the device and further along the axis defined by previously and currently processed cells and the grid, while the grid (111) according to FIG. 4 will promote area directly in front (preferably a suitable sensor is applied to identify the front direction of the device) of the device to be of the same measure.

An exemplary selection of the reference grid is selecting grid (110) when the current measurement differs from the previous one by two or more levels. This may mean moving onto a different floor type and thus should promote different behaviour to the front of the change and promote previous behaviour to the back of the change.

Another exemplary selection of the reference grid is selecting grid (111) when the current measurement and a number of previous measurements were classified as same level and same processing means was used. Such selection will promote a linear processing of the surface.

Next at step (207) the device updates the probabilities by applying the reference grid (100) to the global grid 'placing' cell (103) at its current position. This way every cell on the reference grid (100) corresponds unambiguously to one cell on the global grid.

Preferably, when the procedure reaches this step for the first time, all the probabilities in all cells are set to 0. For each measurement level $\Sigma \in \{1, 2, \ldots, L\}$ and for each processing $m \in \{1, 2, \ldots, M\}$ the probability p{Σ, m} is assigned a new value that is:

greater or equal to p[Σ, m] if σ ∈ Σ
smaller or equal to p[Σ, m] if σ ∉ Σ

Let g be the probability value of the corresponding cell of the reference grid. A modification of the probability on the global grid will provide a better estimation of measurement value by providing probability p[Σ, m] that the cell will render measurement of class Σ when processing m is applied to that cell. An exemplary modification is:

$$p'[\Sigma, m] = \begin{cases} p[\Sigma, m] + (1 - p[\Sigma, m]) * g, & \sigma \in \\ p[\Sigma, m] * (1 - g), & \sigma \notin \end{cases}$$

Additionally for the current cell:

$$p[i, m] = \begin{cases} 1, i \in \Sigma \\ 0, i \notin \Sigma \end{cases}$$

As a consequence of the aforementioned description, FIG. 2A presents also the actual values of the global grid (120) after processing of the first cell (123). FIG. 2A, 2B present shading to illustrate the respective cells of the reference grid of FIG. 1. FIG. 2A, 2B also present area (128) to illustrate the area of first application of the reference grid. This will be referenced in following description for clarity of location on the global grid (120).

FIG. 2B presents the result of the aforementioned exemplary modification after processing of cell (127) being processed after processing of the cell (123). Shading represents the reference grid (100) similarly to FIG. 2A while the area (128) references the previous application of the reference grid i.e. at the time of processing of cell (123).

The presented result assumes the measurement was the same in cells (123) and (127) i.e. belonged to the same level. FIG. 2B presents the values of the global grid (120) modified according to the reference grid (100). For example, the value of cell (126) changes from 0.5 to 0.85 according to the aforementioned exemplary modification while the value of cell (124) remains unchanged according to the same modification.

Preferably the global grid (120) is modified only for the actually determined measurement level.

Finally, the device moves on to the next cell at step (208) and back to step (201) in order to process the next cell. The procedure of selecting the next cell is not within the scope of this invention. However, the determination of the probability grid is.

Figure 8:
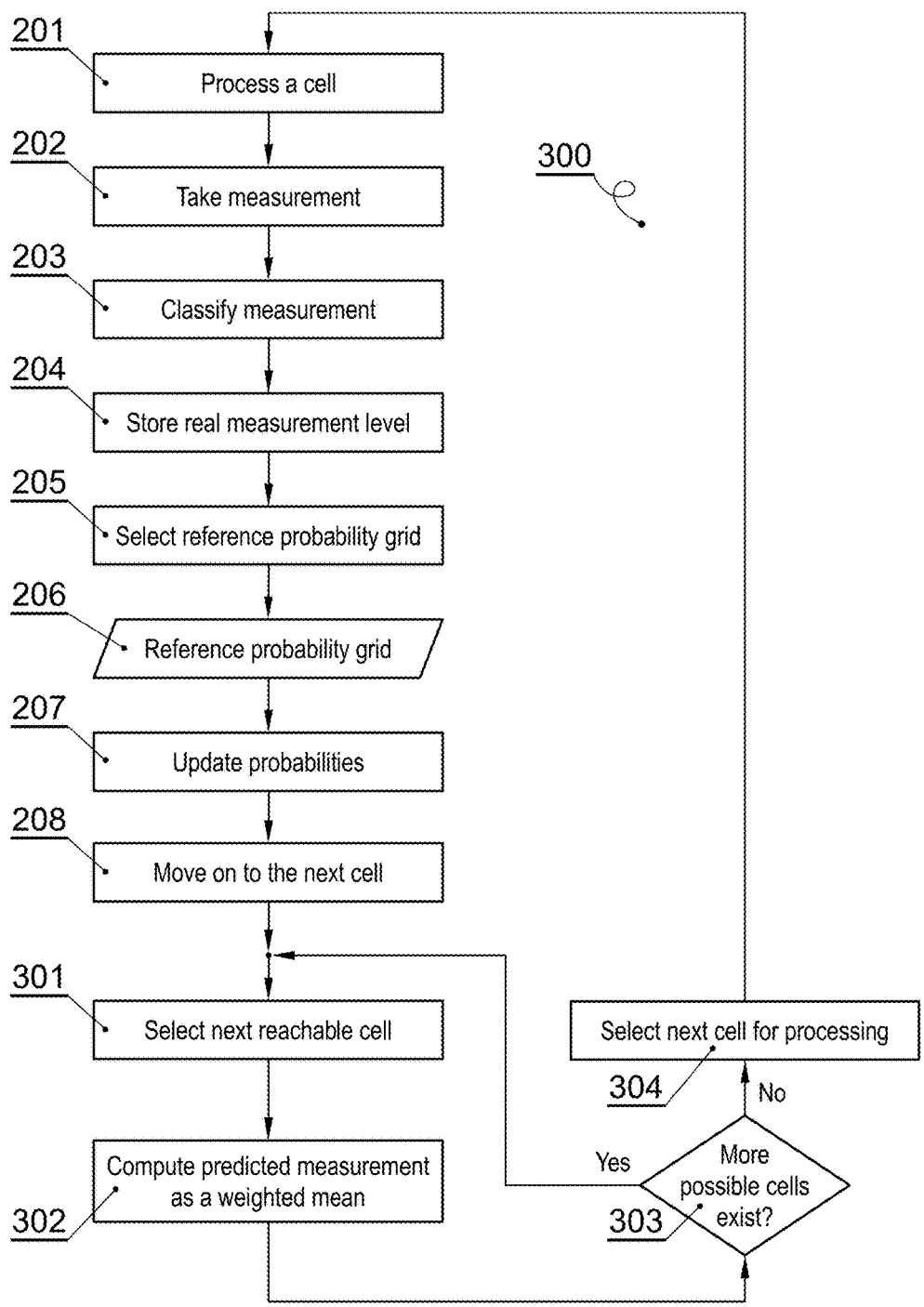
FIG. 8 presents an extended algorithm of updating the global grid and predicting a measurement value.

Yet another exemplary embodiment of the present invention is presented in FIG. 8. FIG. 8 presents a procedure (300) being an extension of the process (200), according to FIG. 7 of the previous exemplary embodiment of the present invention.

All steps present in the procedure (300) that are also present in the process (200) are marked according to FIG. 7 and their description remains unchanged. The procedure (300) extends the process (200) with steps (301) to (304).

Accordingly, the method moves from step (208) to step (301), which selects a cell that is reachable. A reachable cell is a cell that the device is able to process next without processing of any other cell before that. Typically a reachable cell is a neighbouring cell. A skilled person will notice that in case of a flying apparatus, a reachable cell can be virtually any cell. This is not limiting to the present invention. However for the sake of usability the set of reachable cells can be truncated to only neighbouring cells in this case also. In another embodiment the set of reachable cells may be truncated to nearby but not only neighbouring cells and the optimization of the selection bay be left to the device the be determined with the usage of the present invention.

Next, at step (302), the predicted measurement is computed for the selected reachable cell, the predicted measurement being dependent on the measurement values (of the same kind e.g. battery level decrease) stored in the global grid (120) described in the previous exemplary embodiments of the present invention.

The predicted measurement is preferably computed as a weighted sum. All marking is made according to previous embodiments of the present invention. Let p'[Σ, m] be a normalized value of p[Σ, m] i.e.

$$p'[\Sigma, m] = \frac{p[\Sigma, m]}{\sum_{i=1}^{L} p[i, m]}$$

A skilled person will appreciate that the probabilities may also be normalized in broader scope of both Σ and m which is not limiting to the present invention.

A skilled person will also appreciate that there may be more than one means of processing of the reachable cell available from the current situation of the device or not all possible means of processing may be available. In such a case, the presented procedure (300), according to the present embodiment, may be easily adopted. An exemplary adaptation may comprise extending the reachable cells in step (301) to include each cell multiple times, once per each processing means available.

The step (302) computes a predicted measurement as a weighted sum i.e. for a given means of processing m the predicted measurement ϕ. Let $\Sigma_n$ be the reference value of the n-th measurement level. Preferably the reference value is the centre value. The predicted measurement is computed:

$$\phi = \sigma \cdot \sum_{i=1}^{L} (p'[i, m] \cdot \Sigma_i)$$

A skilled person will appreciate that the procedure may further be modified in order to select a cell that has a value of probability of 1 stored in the global grid (120) if such exists within the reachable cells set.

Next, the procedure (300) moves to step (303) and decides whether there are more reachable cells available. If there are, step (301) is executed to select the next reachable cell. If there are not, the next cell is selected for processing at step (304).

Figure 9:
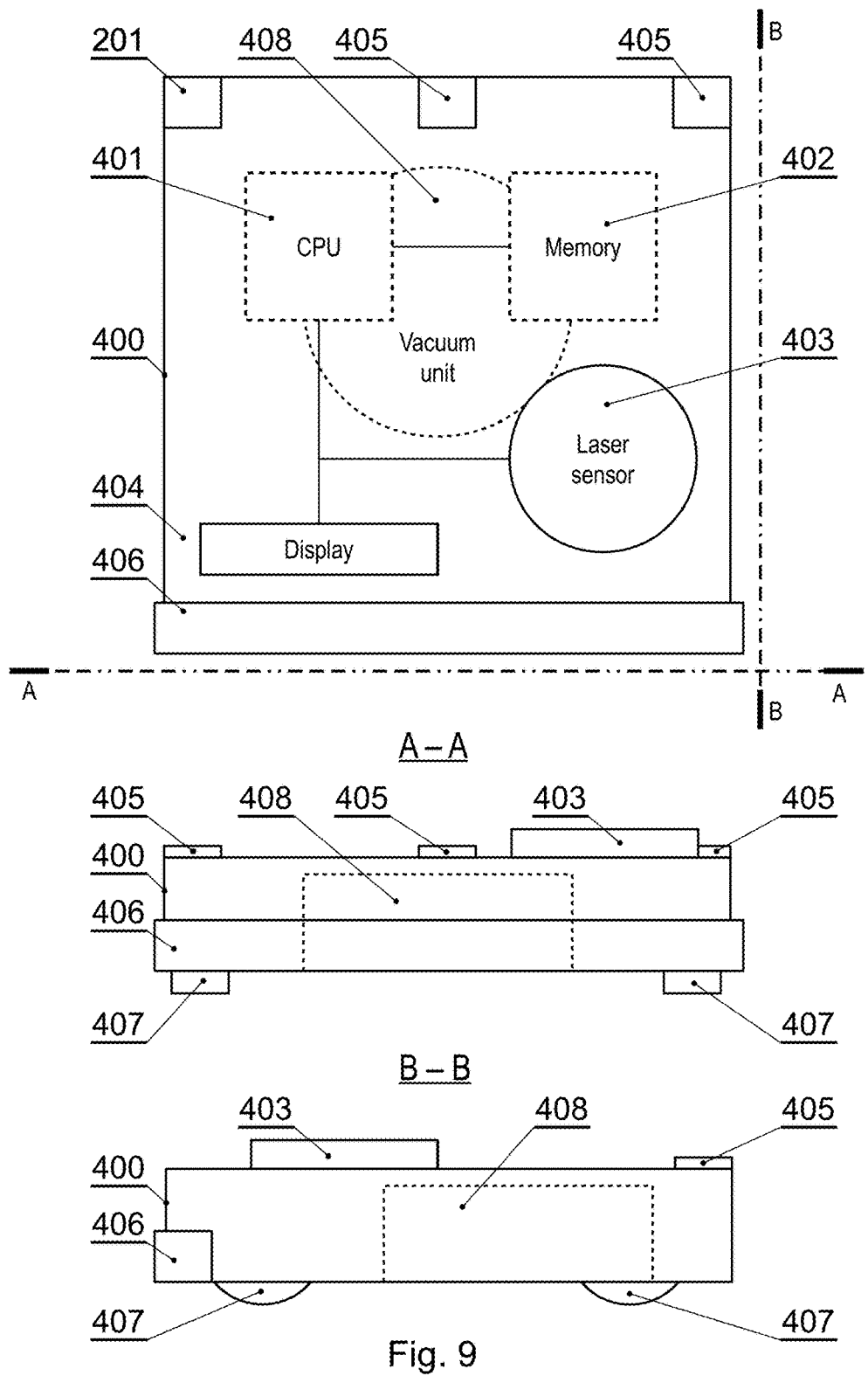
FIG. 9 presents a device employing the method according to the present invention.

The described exemplary embodiments of the present invention may typically be realized by an autonomous surface processing device such as a vacuum cleaner or a lawn mower or the like. An exemplary embodiment of such device is depicted in FIG. 9. The device (400) typically comprises a central processing unit (401) realizing computation and internal memory (402) used to store code and data.

The device is preferably equipped with a display (404) for interacting with the user. The device (400) typically also has a plurality of sensors such as proximity sensors (405), an omni-directional laser distance sensor (403) and a bumper (406) for detecting of direct contact with obstacles.

The device is typically equipped with wheels (407) for mobility. The vacuum unit (408) is used for lifting dust off the processed surface.

The presented device is exemplary only and a skilled person will appreciate that various modification may be done thereto or other devices may utilize the present invention without departing from the broader scope of the technical concept of the present invention.

An exemplary embodiment of the present invention is a method (500) of selection of floor vacuum cleaner's route based on a rectangular grid and the methods according to the present invention.

The present exemplary embodiment in realized by the device (400). The following definitions and assumptions apply to the present embodiment of the present invention:
 1. The global grid is a regular rectangular grid square with cells of the size of the device (400);
 2. the processing means vacuum cleaning the cell i.e. entering the cell while the vacuum unit (408) is operating;

3. The optimized measurement is operating speed, e.g. measured by the time between finishing of processing of two subsequent cells;
4. there are two processing means available: along world X axis and along world Y axis. Note that this assumes the device is able to scan its surroundings (preferably at the beginning of operation or at need) and assign X and Y axes to its modelled world;
5. the device (400) operates along a path traversing all available space along one axis until an obstacle is met and then making a U-turn and traversing along a parallel axis placed half of the device size away from previous. This method ends when there is no more space left to process this way. Next the device (400) identifies unprocessed space and starts same method on that space. The inherent parameter of this algorithm is the direction of the processing towards the modelled world. The direction can be parallel to the X axis of the world (hereinafter referred to as 'X-axis processing') or parallel to the Y axis of the world (hereinafter referred to as 'Y-axis processing').

The method (500) begins at step (501) by selecting an X-axis processing path. Next, at step (502), 3 cells are processed according to this path. Subsequently, at step (503), the Y-axis path is selected and 3 more cells are processed at step (504).

This provides the device with some starting data. Next, at step (505), the device (400) assumes X-axis processing and computes a sum of predicted measurements if the device (400) processed the next 50 cells using such processing. The prediction is made according to the method (300).

Next a similar prediction is made at step (506) with respect to Y-axis processing. At step (507) the axis that provides the higher measurement and therefore higher speed is selected and at step (508) the device (400) processes next 10 cells according to the selected processing axis. The method then moves on to step (505) to re-evaluate the path after 10 cells.

Figure 10:
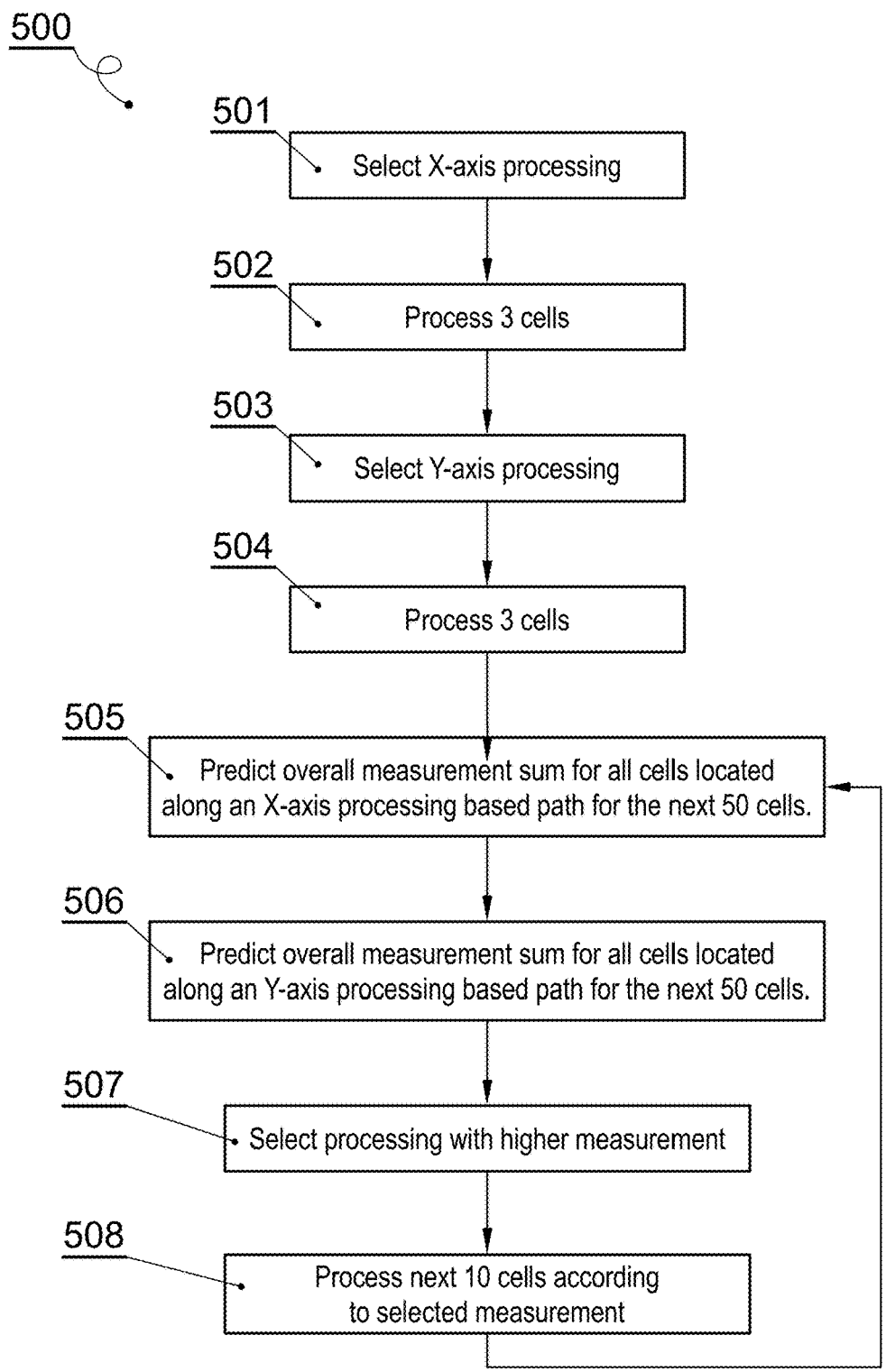
FIG. 10 depicts the method for determining an energy-efficient path of an autonomous device.

The values presented in FIG. 10, items 502, 504, 505, 506 and 508 are exemplary only. The purpose of processing of 3 cells at steps 502 and 504 is to ensure a large-enough initial set of data to start further prediction. In other embodiments it may prove useful to use other values. The purpose of prediction of 50 cells at steps 505 and 506 is to ensure the comparison between measurement predicted for those is meaningful and not random. In other embodiments a much larger or much smaller value may be used depending on estimated operating conditions or grid cell size or cell-to-environment size ratio or the like. The purpose of processing of 10 cells at step 508 is to ensure the stability of processing without the device 400 changing the operating path too frequently. All the aforementioned values may be set arbitrarily or adopted at run-time or adopted arbitrarily before running or the like which is not limiting to the present invention in any way.

The present invention allows for prediction of the processing of surfaces without external data based only on historical information from processing of the surface. It provides a simple and adaptive computation technique. Ultimately, the invention results in improved use of energy of a battery cell of a battery powered device. Therefore, the invention provides a useful, concrete and tangible result.

The present invention and its associated data processing finds its application in a battery powered device and thus the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for determining an enemy-efficient path of an autonomous device may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing ail the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:
1. A method for determining an energy-efficient path of an autonomous device wherein said autonomous device moves over a global grid of cells into which a given operating area has been split, said determination of the energy-efficient path comprises the steps of:
processing of a current cell which represents a current position of the autonomous device;
taking a measurement σ of the processing;
classifying the measurement σ to be of a particular level, taking into account a predefined range of measurement results which is divided into a plurality of distinct levels;
storing said classified measurement in a memory of the autonomous device and associating the stored classified measurement with the current cell;
selecting a reference probability grid, wherein values in the cells of the reference probability grid express a probability that a measurement σ of the processing in a cell will be the same, respectively, to a cell at the reference probability grid, whereas a center cell in the selected reference probability grid which is associated with the current cell is assigned a maximum probability, while other cells within the reference grid have a probability assigned, which lowers with an increase of a distance of a cell from the current cell;

updating the probabilities by applying the reference grid to the global grid at the current position such that each cell on the reference grid corresponds unambiguously to one cell on the global grid; and moving the autonomous device to a next cell of the global grid and setting said next cell as the current cell in order to process the next cell.

2. The method according to claim 1 wherein said taking of the measurement σ of the processing comprises a battery level decrease in the cell.

3. The method of claim 1 wherein the cells of the global grid have a hexagonal shape or an irregular rectangular shape.

4. The method according to claim 1, wherein initially probabilities in all cells of the global grid are set to 0.

5. The method of claim 1, wherein the step of updating the probabilities comprises for each measurement level $\Sigma \in \{1, 2, \ldots, L\}$ and for each processing $m \in \{1, 2, \ldots, M\}$ the probability $p[\Sigma, m]$ is assigned a new value that is:
greater or equal to $p[\Sigma, m]$ if $\sigma \in \Sigma$
smaller or equal to $p[\Sigma, m]$ if $\sigma \notin \Sigma$.

6. The method of claim 1, wherein the applying the reference grid to the global grid at its current position takes into account the center cell of the reference grid.

7. The method of claim 1, further comprising the steps of:
selecting a global grid's cell that is reachable;
computing a predicted measurement, for the selected reachable cell, the predicted measurement being dependent on the measurement values, of the same kind, stored in the global grid;
determining whether there are more reachable cells available and if there are, executing the selecting step in order to select the next reachable cell and otherwise selecting a next cell for processing.

8. The method of claim 7, wherein the predicted measurement is computed as a weighted sum $p[\Sigma, m]$ being a normalized value of $p[\Sigma, m]$:

$$p'[\Sigma, m] = \frac{p[\Sigma, m]}{\sum_{i=1}^{L} p[i, m]}.$$

9. A non-transitory computer readable medium storing computer-executable instructions performing all the steps of the computer-implemented method according to claim 1 when executed on a computer.

* * * * *